United States Patent [19]

Harris

[11] 4,047,018

[45] Sept. 6, 1977

[54] LAMP ASSEMBLY

[75] Inventor: Mervyn George Harris, Solihull, England

[73] Assignee: The Lucas Electrical Company Limited, Birmingham, England

[21] Appl. No.: 637,179

[22] Filed: Dec. 3, 1975

[30] Foreign Application Priority Data

Dec. 14, 1974 United Kingdom ............... 54150/74

[51] Int. Cl.[2] .......................... B60Q 1/00; B60Q 3/00; B60Q 11/00

[52] U.S. Cl. ................................ 240/7.1 R; 240/8.16; 240/52.1; 240/57; 339/97 R

[58] Field of Search .................. 240/7.1 R, 52.1, 8.16, 240/8.2, 8.3, 10 T, 57, 73 DA, 73 QD; 339/119 R, 131, 97 R, 99, 97 L

[56] References Cited

U.S. PATENT DOCUMENTS

| | | | |
|---|---|---|---|
| 3,511,982 | 5/1970 | Salter | 240/8.16 |
| 3,543,014 | 11/1970 | Bustad | 240/8.16 X |
| 3,638,009 | 1/1972 | Strianese | 240/8.16 X |

*Primary Examiner*—Richard A. Wintercorn
*Attorney, Agent, or Firm*—Holman & Stern

[57] ABSTRACT

A lamp assembly comprises a reflector body having an aperture in the rear thereof which is closed by a bulbholder. The bulbholder houses electrical contacts for engaging a bulb which contacts are integrally formed with respective electrical terminals which project from the bulbholder. The bulbholder is welded to the reflector body so as to trap respective electrical connectors, which form part of a printed circuit power supply, between the electrical terminals and the reflector body, so that the electrical terminals are electrically connected to the respective electrical connections, a power supply thereby being provided to the bulb.

11 Claims, 4 Drawing Figures

LAMP ASSEMBLY

This invention relates to a lamp assembly, and particularly, though not exclusively, to a vehicle lamp arrangement embodying same.

According to the present invention, there is provided a lamp assembly comprising a body having an aperture therein, an electrically insulating bulbholder closing said aperture, at least one electrical terminal carried by said bulbholder, and an electrical connector for connecting the or each electrical terminal to a power supply in use, the or each electrical connector being trapped between its respective electrical terminal and said body so as to be electrically connected with the former.

Preferably, the bulbholder includes a hollow body for receiving a bulb in use, and the or each electrical terminal is housed in and projects from an arm portion which is integral with said hollow body and which extends laterally therefrom, the electrical connector associated with the or each electrical terminal also being trapped between the respective arm portion and the first mentioned body.

The or each electrical terminal may be electrically connected to an electrical contact disposed in said bulbholder and is advantageously formed integrally therewith.

The or each electrical connector preferably forms part of a printed circuit power supply.

Conveniently, said bulbholder and said body are formed from plastics material.

Advantageously, said bulbholder is welded to said body.

Preferably, the or each electrical terminal locates in a recess in said body and the corresponding electrical connector is trapped in said recess.

Figure 1:
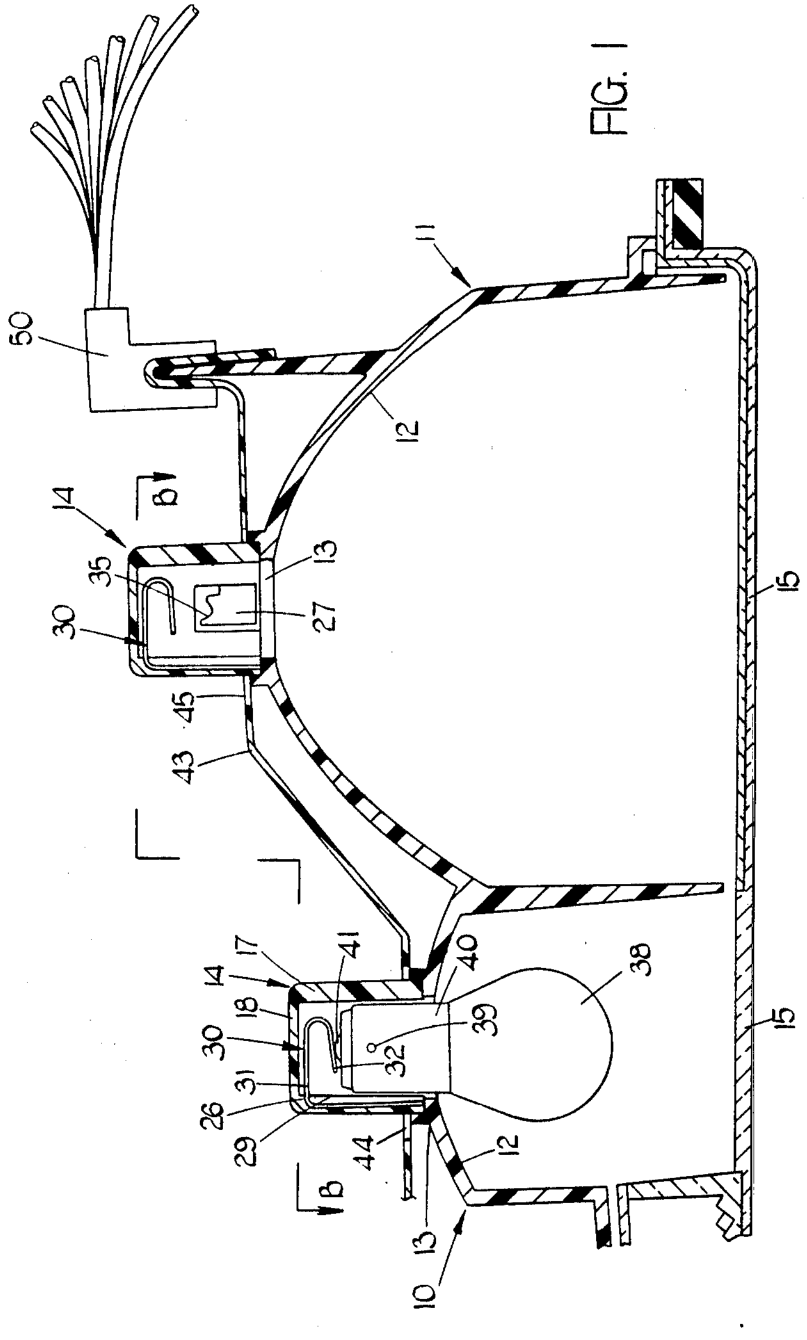
Figure 2:
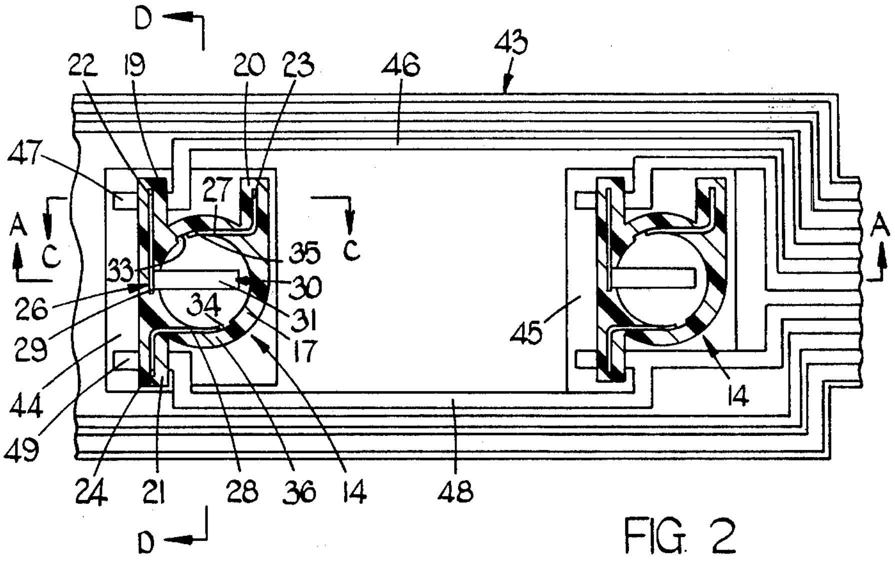
Figure 3:
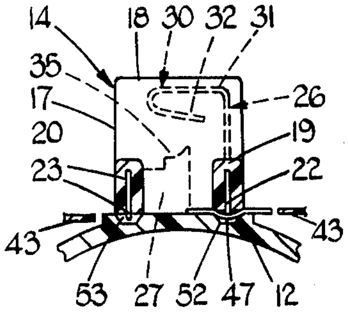
Figure 4:
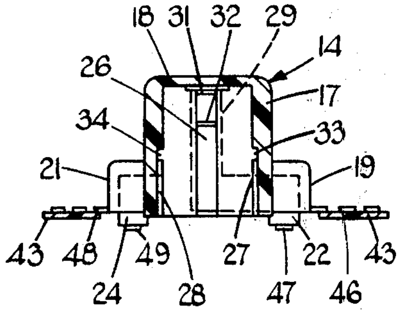

An embodiment of the present invention will now be described, by way of example, with reference to the accompanying drawings, in which:

FIG. 1 is a lateral section along the line A-A of FIG. 2 of part of a vehicle lamp arrangement embodying a plurality of lamp assemblies according to the present invention, FIG. 2 is a sectional plan view on the line B-B of the vehicle lamp arrangement of FIG. 1, FIG. 3 is a section along the line C-C in FIG. 2, and FIG. 4 is a section along the line D-D in FIG. 2.

Referring to the drawings, the vehicle lamp arrangement embodies a plurality of lamp assemblies, two such lamp assemblies 10 and 11 being shown in FIG. 1. Each of the lamp assemblies 10 and 11 comprises generally a reflector body 12 having a central aperture 13 in the rear thereof, a bulbholder 14 and a lens element 15 disposed in front ot the reflector 12. The reflector 12 and bulbholder 14 are formed from plastics material.

The construction of lamp assembly 10 will now be described in greater detail, and it is to be understood that the construction of lamp assembly 11 is virtually identical. Referring in particular to FIGS. 2, 3 and 4, the bulbholder 14 includes a hollow body 17 of circular, cylindrical shape. One end of the body 17 is open, the other end thereof being closed by an integral end 18. Three arm portions 19,20 and 21 extend tangentially from body 17 at its open end, and are formed integrally therewith. The arm portions 19, 20 and 21 are slotted so as to receive respective electrical terminals 22, 23 and 24 which project therefrom in directions parallel to the longitudinal axis of the body 17.

Three electrical contacts 26, 27 and 28 are mounted within the body 17 of bulbholder 14. The contact 26 is formed integrally with terminal 22, and extends along a recess 29 in the interior wall of body 17. Contact 26 terminates in a resilient hooked portion 30, which portion 30 has a part 31 disposed adjacent end 18 and parallel thereto, and a part 32 which is bent over. The contacts 27 and 28 are integrally formed with terminals 23 and 24 respectively, and locate in respective recesses 33 and 34 on opposite sides of the interior wall of body 17. The contacts 27 and 28 are provided with respective cut-outs 35 and 36 facing away from the open end of body 17.

The bulb holder 14 receives a bulb 38, as is shown in FIG. 1. The bulb 38 is provided with lugs 39 on a base 40 thereof, and these lugs 39 engage in bayonet fashion the cut-outs 35, 36 in the contacts 27, 28 respectively. A contact 41 on the base of 40 of bulb 38 engages part 32 of the contact 26, and the resilience of the hooked portion 30 of the latter urges the lugs 39 into engagement with the cut-outs 35, 36.

A flexible printed circuit board 43 extends between the lamp assemblies 10 and 11 and has two apertures 44, 45 therein through which the bulbholders 14 of lamp assemblies 10 and 11 respectively extend (see FIGS. 1 and 2). The printed circuit board 43 as a plurality of electrically conductive tracks thereon. One of these tracks, 46 terminates in an electrical connector 47 which projects into the aperture 44. Another of the tracks, 48 terminates in an electrical connector 49 which also projects into the aperture 44. The tracks 46, 48 are connected to a power supply i.e. a battery of the vehicle (not shown) via a wiring harness 50 (FIG. 1) with track 48 forming an earthing line.

The open end of bulbholder 14 is welded to the reflector body 12 of lamp assembly 10, such that bulbholder 14 closes the aperture 13 in reflector body 12 from the rear thereof. Each of the terminals 22, 23, 24 locates in a recess in the rear surface of reflector body 12, as illustrated in FIG. 3, only those recesses 52, 53 which are associated with the terminals 22, 23 respectively being shown. The arm portion 19 of bulbholder 14 and the reflector body 12 trap the connector 47 in the recess 52, with the terminal 22 in electrical contact with the connector 47. Similarly, the arm portion 21 and the reflector body 12 trap the connector 49 in the recess associated with terminal 24, with the latter in electrical contact with the connector 49. In this way, contacts 26 and 28 are connected to the battery of the vehicle.

The lamp assembly 10 is assembled in use by firstly locating the contacts 26, 27, 28 and their respective terminals 22, 23, 24 in the slots in the respective arm portions 19, 20, 21 of bulbholder 14. The bulbholder 14 and reflector body 12 are then disposed on opposite sides of the printed circuit board 43, with terminals 22, 23, 24 aligned with their respective recesses in the reflector body 12, and with terminals 22, 24 also aligned with the connectors 47, 49 respectively. Bulbholder 14 is then welded to the rear of reflector body 12, thereby trapping the connectors 47 and 49 in the manner described above.

I claim:

1. A lamp assembly comprising a body, means defining an aperture in said body, an electrically insulating bulbholder enclosing said aperture and detachably receiving a bulb, at least one electrical contact fixed in said bulbholder for engagement with said bulb, an electrical terminal connected to each said electrical contact and carried by said bulbholder, and an electrical connector for connecting each said electrical terminal to a power supply, each said electrical connector being trapped between its respective electrical terminal and said body so as to be electrically connected with said respective electrical terminal.

2. The lamp assembly according to claim 1, wherein each said electrical terminal locates in a recess in said body, and the corresponding electrical connector is trapped in said recess.

3. The lamp assembly according to claim 1, wherein said bulbholder includes a hollow body for receiving a bulb in use, and each said electrical terminal is housed in and projects from a respective arm portion which is integral with said hollow body and which extends laterally therefrom, each said electrical connector also being trapped between the arm portion which houses the respective electrical terminal and said body.

4. The lamp assembly according to claim 3, wherein said hollow body of said bulbholder is circular cylindrical in form and each arm portion extends tangentially therefrom.

5. The lamp assembly according to claim 1, wherein each said electrical terminal is integrally formed with its associated electrical contact.

6. The lamp assembly according to claim 1, wherein three electrical terminals are provided, the electrical contacts associated with two of said electrical terminals having cut-outs therein for receiving respective lugs on said bulb in bayonet fashion in use, and the electrical contact associated with the third of said electrical terminals having a resilient portion which engages a base of said bulb in use so as to urge the lugs on said bulb into engagement with the cut-outs.

7. The lamp assembly according to claim 1, further comprising a printed circuit power supply, each said electrical connector forming part of said printed circuit power supply.

8. The lamp assembly according to claim 7, wherein said printed circuit power supply includes a printed circuit board having an aperture therein, into which aperture each said electrical connector extends, said bulbholder being aligned with the aperture in said printed circuit board.

9. The lamp assembly according to claim 1, wherein said bulbholder and said body are formed from plastics material.

10. The lamp assembly according to claim 1, wherein said bulbholder is welded to said body.

11. The lamp assembly according to claim 1, wherein said body is dished and forms a reflector.

* * * * *